US 9,348,041 B2

(12) United States Patent
Jeffryes

(10) Patent No.: US 9,348,041 B2
(45) Date of Patent: May 24, 2016

(54) PHASE MODULATION AND NOISE MINIMIZATION FOR SIMULTANEOUS VIBROSEIS ACQUISITION

(75) Inventor: Benjamin P. Jeffryes, Histon (GB)

(73) Assignee: WesternGeco L.L.C., Houston, TX (US)

( * ) Notice: Subject to any disclaimer, the term of this patent is extended or adjusted under 35 U.S.C. 154(b) by 949 days.

(21) Appl. No.: 13/397,378

(22) Filed: Feb. 15, 2012

(65) Prior Publication Data

US 2013/0208567 A1 Aug. 15, 2013

(51) Int. Cl.
*G01V 1/28* (2006.01)
*G01V 1/00* (2006.01)

(52) U.S. Cl.
CPC . *G01V 1/005* (2013.01); *G01V 1/28* (2013.01); *G01V 2210/32* (2013.01)

(58) Field of Classification Search
CPC ...... G01V 1/005; G01V 1/28; G01V 2210/32
USPC .............................................. 367/38, 41, 189
See application file for complete search history.

(56) References Cited

U.S. PATENT DOCUMENTS

| 4,686,654 | A | * | 8/1987 | Savit | 367/41 |
| 4,823,326 | A | | 4/1989 | Ward | |
| 5,719,821 | A | * | 2/1998 | Sallas et al. | 367/41 |
| 6,181,646 | B1 | * | 1/2001 | Bouyoucos et al. | 367/189 |
| 6,714,867 | B2 | | 3/2004 | Meunier | |
| 7,376,046 | B2 | * | 5/2008 | Jeffryes | 367/41 |
| 2003/0093224 | A1 | | 5/2003 | Jeffryes | |
| 2004/0148104 | A1 | | 7/2004 | Moerig et al. | |
| 2007/0188172 | A1 | | 8/2007 | Garwood et al. | |
| 2008/0205193 | A1 | | 8/2008 | Krohn et al. | |
| 2009/0116337 | A1 | | 5/2009 | Chiu et al. | |

FOREIGN PATENT DOCUMENTS

| CN | 87107204 A | 8/1988 |
| WO | 2010093896 A2 | 8/2010 |

OTHER PUBLICATIONS

Office Action issued in corresponding Russian Application No. 2014137135 mailed Sep. 7, 2015 (18 pages).
Communication pursuant to Article 94(3) EPC issued in related EP Application No. 13749351.6 mailed Jan. 25, 2016 (6 pages).
Supplementary European Search Report issued in related EP Application No. 13749351.6 mailed Jan. 4, 2016 (3 pages).
Official Action issued in related MX Application No. MX/a/2014/009814 mailed Dec. 7, 2015, and partial English translation by Agent (7 pages).
Office Action issued in related CN Application No. 201380009625.8 mailed Feb. 1, 2016, with English translation by agent (14 pages).

\* cited by examiner

*Primary Examiner* — Daniel L Murphy

(57) ABSTRACT

An embodiment of the invention includes simultaneous drive signals whose respective phase angle offset(s) varies over a portion or duration of the simultaneous sweeps. Other embodiments are discussed herein.

20 Claims, 5 Drawing Sheets

PHASE MODULATION AND NOISE MINIMIZATION FOR SIMULTANEOUS VIBROSEIS ACQUISITION

BACKGROUND

In seismic prospecting using simultaneous vibratory techniques, a series of seismic energy sources (e.g., vibrators) are employed to transmit seismic signals into the earth. Part of these signals are reflected from interfaces between subterranean strata, and/or refracted within strata, back to the surface of the earth, where they are detected by one or more receivers. The time taken for a signal to pass from a particular vibrator to a particular receiver gives an indication of the length of travel of the signal between that vibrator and that receiver, from which the structure of geological formations may be deduced.

With simultaneous vibratory techniques vibrators collectively and simultaneously impart energy into the earth from multiple source locations. Thus, each receiver detects refracted and reflected energy which has been emitted by the whole series of vibrators. (As an aside, "simultaneous" sweeping entails overlap between the sweeps. The sweeps may or may not begin and/or end at the same time so long as there is some portion of overlap between the sweeps.) The data recorded at each receiver must then be processed so that the signal due to each individual vibrator can be separated out.

This separation may be achieved by each vibrator performing multiple "sweeps" or "shots," where the relative phase of the signals emitted by the vibrators are varied between vibrators and between shots (although the relative phase is held constant through the duration of the respective sweeps). This can be illustrated by the case of two vibrators, twice operated simultaneously. If they are operated in phase with each other for the first sweep, but 180° out of phase for the duration of the second sweep, the receiver will record two signals (i.e., the "relative phase angle" between the two vibrator drive signals is 180° out of phase for the duration of the second sweep). (As an aside, all four of the sweeps may be driven, via a "driving signal" or "control signal," at the same amplitude with a swept-frequency, possibly with tapered ends because the amplitude has to be ramped up at the start and ramped down at the end. The control signal may begin at low frequency and finish at high frequency, and the frequency may increase linearly with respect to time.) The resultant recorded signals may be added together to determine the signal arriving from the first vibrator, or subtracted to determine the signal arriving from the second vibrator.

While signal separation has improved over the years, noise minimization and signal separation can still be improved to better locate subterranean areas of interest.

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

Figure 1:
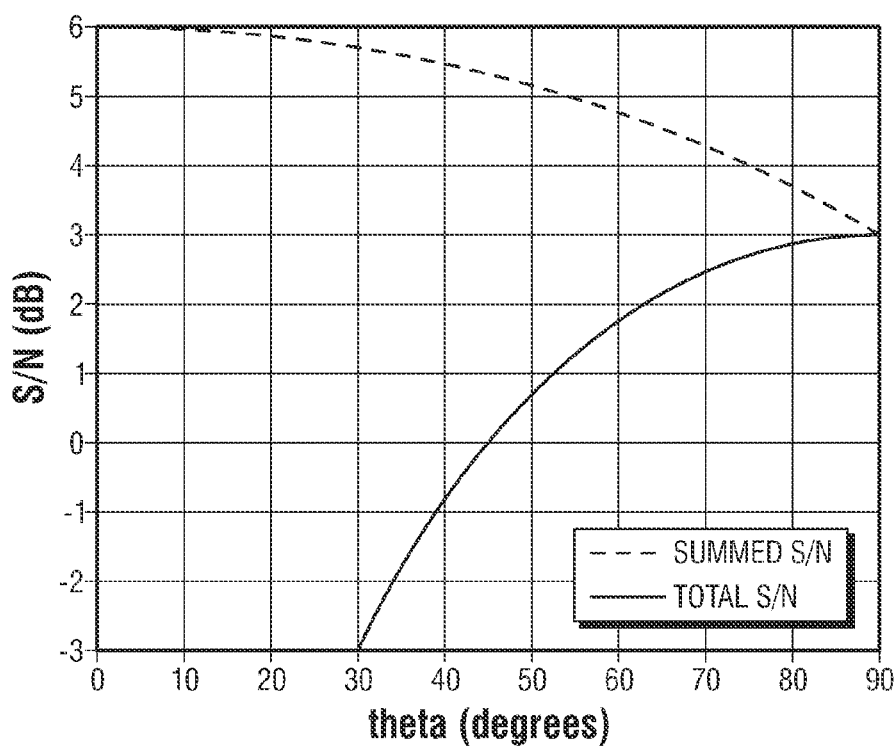
FIG. 1 includes summed and total signal to noise (S/N) for 2×2 source matrices vs. phase.

In the following description, numerous specific details are set forth but embodiments of the invention may be practiced without these specific details. Well-known circuits, structures and techniques have not been shown in detail to avoid obscuring an understanding of this description. "An embodiment," "various embodiments" and the like indicate embodiment(s) so described may include particular features, structures, or characteristics, but not every embodiment necessarily includes the particular features, structures or characteristics. Some embodiments may have some, all or none of the features described for other embodiments. "First," "second," "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same embodiment.

As mentioned above, in conventional simultaneous vibroseis acquisitions the relative phase angles between the control signals of the different vibrators are kept constant through the duration of the sweep. However, an embodiment of the invention includes simultaneous drive signals whose relative phase angle offset(s) varies over a portion (or duration) of the simultaneous sweeps.

For example, with conventional simultaneous seismic vibrator acquisition multiple vibrators sweep through a range of frequencies using a control mechanism which seeks to maintain a constant relative phase between the different vibrators. Consider two vibrators V1 and V2 with controllers that attempt to maintain ground forces F1 and F2. The Fourier transforms of the two ground forces are f1 and f2. According to conventional methods, the ratio of f1 to f2 is constant with frequency. (As an aside, while the controlled quantity is not necessarily the ground force, the ratio of the control parameters is constant with frequency.) However, in an embodiment the relative phase (i.e., "phase offset") of the control parameters of multiple vibrators is controlled to vary with frequency. For instance, two vibrators are driven with phases whose control parameters (e.g., ground force) follow the designed trajectory:

$$F_A = W(t)\cos(2\pi[f_0 t + \tfrac{1}{2}\phi t^2])$$

$$F_B = W(t)\cos(2\pi[f_0 t + \tfrac{1}{2}\phi t^2] + \Theta[t])$$

with vibrator 1 following $F_A$ for the first shot and $F_B$ for the second shot, and vibrator 2 following $F_B$ for the first shot and $F_A$ for the second shot, where $\phi$ is the rate of change of frequency, $f_0$ is the start frequency, W is a smooth function (which rises from 0 to a maximum over a short time, stays at the maximum for a duration, and then declines to 0 over a short time), and Θ is a phase angle offset. According to conventional methods Θ is a constant but in an embodiment of the invention Θ varies as a function of time. In one embodiment, Θ(t) is close to 0 at the start of the sweep, rises to π/2 mid-sweep, and stays at π/2 until the end of the sweep. Thus, the relative phase angle Θ(t) of the control parameter of the sweep (e.g., control or drive signals) changes through all or a portion of the course of the two or more simultaneous sweeps. The sweeps need not necessarily start and/or finish at the same time, but are simultaneous (i.e., overlap) in an embodiment.

Although in the example above there are two vibrators performing an up-sweep (frequency increasing with time) at a constant rate-of-change of frequency, embodiments may be applied to any number of vibrators, with a variable rate-of-change of frequency, and either up-sweeps or down-sweeps (frequency decreasing with time). Also, although in the above example the vibrators are on land, and the signals are received by geophones, the vibrators may be located in other environments such the sea-bottom or suspended in water. The reflected or refracted waves from the vibrators may be received by other methods such as, for example, accelerometers or hydrophones. Further, the simultaneous sweeping may be performed with varying sweeps such as, for example, slip sweep surveying, High Fidelity Vibratory Seismic (HFVS) techniques, and the like.

In the following passages greater details are laid out for various embodiments of the invention.

Effect of Phase and Phase Modulation

In simultaneous vibroseis acquisition, a number of vibrators (N) may sweep a number of times (M) while stationary. The sweeps may be identical (at least by design) in all respects except one, namely the vibrator starting phase. In the frequency domain the relationship between the signal measured at a receiver and the transfer functions from the individual vibrator points (VPs) can be described in the form of a matrix equation G=SI, where G are the receiver signals (an M×1 vector for each receiver), S is an (M×N) matrix, and I is a (N×1) vector of the individual impulse responses. As the sweeps all have the same amplitude but different phases, the elements of S may all be normalized to have amplitude 1 and thus are characterized only by phase. In other embodiments the amplitudes need not be the same.

Some strategic decisions in simultaneous vibroseis revolve around the "best" choice of phases. Criteria for deciding which phases to use may center on the effects of matrix inversion on noise (e.g., environmental noise or coherent noise that results from the vibrator harmonics).

Looking at the effects of environmental noise alone and assuming the noise from one shot to the next is uncorrelated; minimizing the total noise on the estimated impulse response from each VP considered separately is equivalent to choosing a matrix S all of whose singular values are of equal amplitude. However, if instead of looking at the total noise on each VP separately one considers the noise after further filtering has been applied (e.g., averaging data from a number of VPs, applying spatial low-pass filtering, etc.), then other phases may be optimal, and it may be advantageous to have a phase matrix that changes with frequency (i.e., the relative phase of different vibrators is frequency dependent). Optimization can also take account of harmonic noise from the following shot during simultaneous shooting.

Thus, it may be advantageous to vary relative phase between sweeps during simultaneous acquisition even if the records from the individual VPs are subsequently summed to form one group. The data improvement possible from allowing improved shot point statics and source signature variation correction may outweigh any reduction in signal-to-noise (S/N) with respect to random environmental noise.

Also, the use of vibrator phase optimization (i.e., varying relative phase angle) combined with concatenated simultaneous shooting may yield better spatial sampling, individual shot point statics and signature adjustment, and better data quality overall within the same time per VP as conventional group shooting.

Phase and Signal to Noise Levels

Although the following is open to analytic analysis for any size of matrix S, for explanatory purposes the following example concerns a 2×2 source matrix S (two vibrators, shooting twice) written as follows:

$$S = \begin{pmatrix} 1 & e^{i(\Theta+\varphi)} \\ e^{i(\Theta-\varphi)} & 1 \end{pmatrix}$$

For each vibrator, and each shot, the actual sweep performed in an embodiment is the real part of the appropriate component of S, multiplied by the same swept frequency signal. Thus, if the first shot from the first vibrator is of the form given by $F_A$ in equation 1, then the first shot for vibrator two may be:

$$F_{21} = W(t)[\cos(\Theta+\varphi)\cos(2\pi[f_0 t + \tfrac{1}{2}\varphi t^2]) - \sin(\Theta+\varphi)\sin(2\pi[f_0 t + \tfrac{1}{2}\varphi t^2])]$$

and the second shot for vibrator one may be:

$$F_{12} = W(t)[\cos(\Theta-\varphi)\cos(2\pi[f_0 t + \tfrac{1}{2}\varphi t^2]) - \sin(\Theta-\varphi)\sin(2\pi[f_0 t + \tfrac{1}{2}\varphi t^2])]$$

Phase of each row may be rotated independently. (This includes an assumption that the vibrators shoot individually and repeatedly. It is not necessary for the two vibrators to be 100% identical). Inverting this matrix yields:

$$S^{-1} = \frac{1}{1 - e^{(2i\Theta)}} \begin{pmatrix} 1 & -e^{i(\Theta+\varphi)} \\ -e^{i(\Theta-\varphi)} & 1 \end{pmatrix}$$

If there is noise $n_1$ on the first shot and noise $n_2$ on the second shot then the noise ($g_1$ and $g_2$) that appears on the separated signals will be respectively:

$$g_1 = \frac{1}{1 - e^{(2i\Theta)}}(n_1 - e^{-i(\Theta+\varphi)} n_2)$$

$$g_2 = \frac{1}{1 - e^{(2i\Theta)}}(n_2 - e^{-i(\Theta-\varphi)} n_1)$$

Assuming that the noise on each record is independent and with the same expectation value, then the total noise power is given by:

$$n_T^2 = |g_1|^2 + |g_2|^2 = \frac{2}{1 - \cos(2\Theta)} \langle n^2 \rangle$$

However, if the two records are first summed, the noise is given by $$n_S^2 = |g_1 + g_2|^2 = \frac{4(1 - \cos(\Theta)\cos(\varphi))}{1 - \cos(2\Theta)} \langle n^2 \rangle$$

Thus, as seen in FIG. 1, for values of Θ less than π/2 (90 degrees), the lowest value of the summed power is obtained with Θ=0, with no effect on the total power. Thus, without loss of generality, noise may be plotted against angle Θ. FIG. 1 shows the summed signal to noise relationship and the total signal to noise relationship, referenced to the signal-to-noise level that would have been obtained by shooting with one vibrator on the first VP with the same sweep and then shooting on the second VP with one vibrator with the same sweep.

As shown in FIG. 1, the choice of angle that is best for the total noise may be less than optimal for the summed noise. As Θ is reduced from 90 to 0 degrees, the summed S/N improves by 3 dB, approaching the level expected for a group shoot (i.e., two vibrators shooting twice in phase). The effect of changing the angle on the total noise is more dramatic, as instead of approaching a finite value, the S/N drops to minus infinity as the matrix becomes singular.

If, for different frequencies, there is a difference in the relative importance of the summed signal-to-noise versus the total signal to noise, then it may be advantageous to vary the angle Θ with frequency in an embodiment. In general, if the two vibrators are physically close together, at the low end of the frequency range, summed signal to noise may be more important, whereas at the high end of the frequency range, total signal to noise may be more important.

Spatial Noise Filtering

The results of FIG. 1 are independent of the spatial distribution of vibrators, and illustrated contributions of different vibrators may be individually analyzed and corrections may be made before forming a group sum, without serious impact on the suppression of random noise.

One application of simultaneous shooting is to improve the spatial shot sampling density, and hence the contributions from individual vibrators will not be simply added together to form a group. Rather some form of spatial filtering may be applied to the data in the common-receiver domain.

Just as different source matrices result in different summed and total S/N ratios, different source matrices also result in different spatial noise spectra when the individual vibrators have a known spatial distribution. For example, consider the situation where vibrators are shooting along a line with a fixed spatial separation between vibrators. Using the 2×2 matrix S parameterized as above, the noise of each trace is given by:

$$g_1 = \frac{n_1 - e^{-i(\Theta+\varphi)}n_2}{(1-e^{2i\Theta})}$$

$$g_2 = \frac{n_2 - e^{-i(\Theta-\varphi)}n_1}{(1-e^{2i\Theta})}$$

Considering noise (spatially) as an uncorrelated scalar, and assuming the VPs are separated by a distance d, then taking the spatial Fourier transform of this, leads to $$\tilde{g}(k) = \frac{1}{(1-e^{2i\Theta})}([1 - e^{-i(\Theta-\varphi)}e^{ikd}]\tilde{n}_1 + [e^{ikd} - e^{-i(\Theta+\varphi)}]\tilde{n}_2)$$

and thus, the spatial power spectrum is $$|\tilde{g}(k)|^2 = \frac{2(1-\cos(\Theta)\cos(\phi-kd))}{(1-\cos(2\Theta))}|\tilde{n}|^2$$

Figure 2:
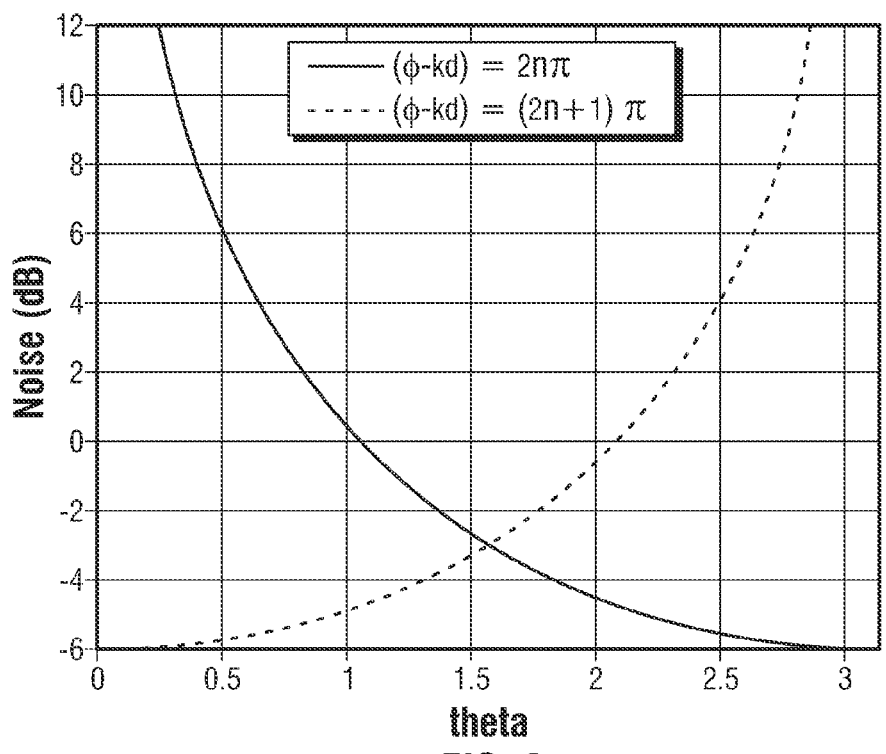
FIG. 2 includes max and min noise as a function of phase for 2×2 matrices.

FIG. 2 shows the noise in dB as a function of Θ, normalized by the total noise, for the (φ−kd)=2nπ and (φ−kd)=(2n+1)π. (The curve which approaches −6 dB on the y axis on the right is the former, and the curve which approaches −6 dB on the left is the latter). When Θ=π/2, the source matrix is $$S = \begin{pmatrix} 1 & ie^{i\varphi} \\ ie^{-i\varphi} & 1 \end{pmatrix}$$

and the noise is independent of spatial frequency. For other values of Θ, there is a wavenumber at which the noise is a minimum, and a wavenumber at which the noise is a maximum. As Θ moves away from π/2, the difference between the maximum and minimum increases.

One situation will be where one wishes to improve S/N at low spatial wave numbers, which is where main reflection signals may be located in the spatial frequency domain. Higher spatial wave numbers may be filtered out (e.g., at low frequencies) during processing, so if there is random noise at these spatial frequencies the noise may be removed latter in the processing chain.

Assuming that there is no preferred direction (so a symmetric curve of noise versus spatial wavenumber with a 0 at k=0 is desirable) then φ may be set equal to zero.

Figure 3:
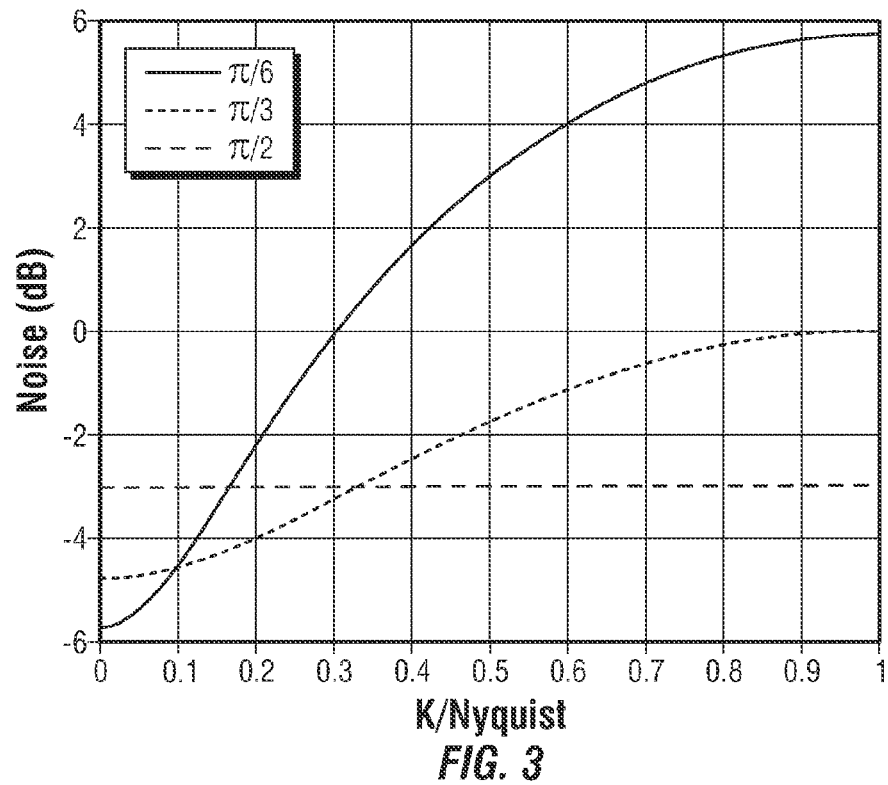
FIG. 3 includes a noise spectrum for three phase values in 2×2 matrices.

FIG. 3 shows noise as a function of spatial frequency for three values of Θ (π/6, π/3 and π/2). For the largest angle the noise is independent of spatial frequency, and is 3 dB down on the noise level for individual vibrator shooting. For the middle angle, the noise peaks at the original noise level (at Nyquist spatial wave number) and is 4.75 dB down at 0 wave number, and for the smallest angle, the 0 wave number noise is reduced by 5.7 dB at 0 wave number (close to the minimum possible of 6), but is increased by a similar amount at Nyquist.

If the processing chain that the acquired data pass through includes frequency dependent spatial filtering (e.g., fk filtering), then it may be advantageous for the relative phase angle Θ to be low at low frequencies, increasing to π/2 at the frequency where the full spatial bandwidth is included.

This example is for 2 vibrators and considers spatial frequencies only in one direction, purely for clarity in the description. For more than two vibrators, it may be advantageous for the relative phase angle between vibrators to be smaller at low frequencies than at high frequencies. For more than two vibrators arranged in a 2 dimensional spatial pattern, angles may be chosen which improve noise suppression at low spatial frequencies in all spatial frequency directions.

Although it is possible simply to choose matrix phase angles that give an acceptable variation in noise with spatial frequency, it may be advantageous in some embodiments to have a process for choosing angles more objectively. This can be done through mathematical optimization.

Using the spatial noise power spectrum, given an objective function one can find the matrix of a particular size that minimizes that function. If the objective function is symmetric in k, it implies that S is unchanged if the column order is reversed (i.e., if one row of the matrix is (a, b . . . c), then M also contains a row of the form (c . . . b, a)).

One example of an objective function is to minimize the noise over spatial wavenumbers from −K to K, for some K. To provide some stabilization at all wavenumbers it can be adjusted by adding at term depending on the maximum noise, thus for instance:

$$E1 = \frac{1}{2K} \int_{-K}^{K} |\tilde{N}|^2 dk$$

$$E2 = \frac{1}{2K} \int_{-K}^{K} |\tilde{N}|^2 dk + \frac{1}{10} \max(|\tilde{N}|^2)$$

Figure 4:
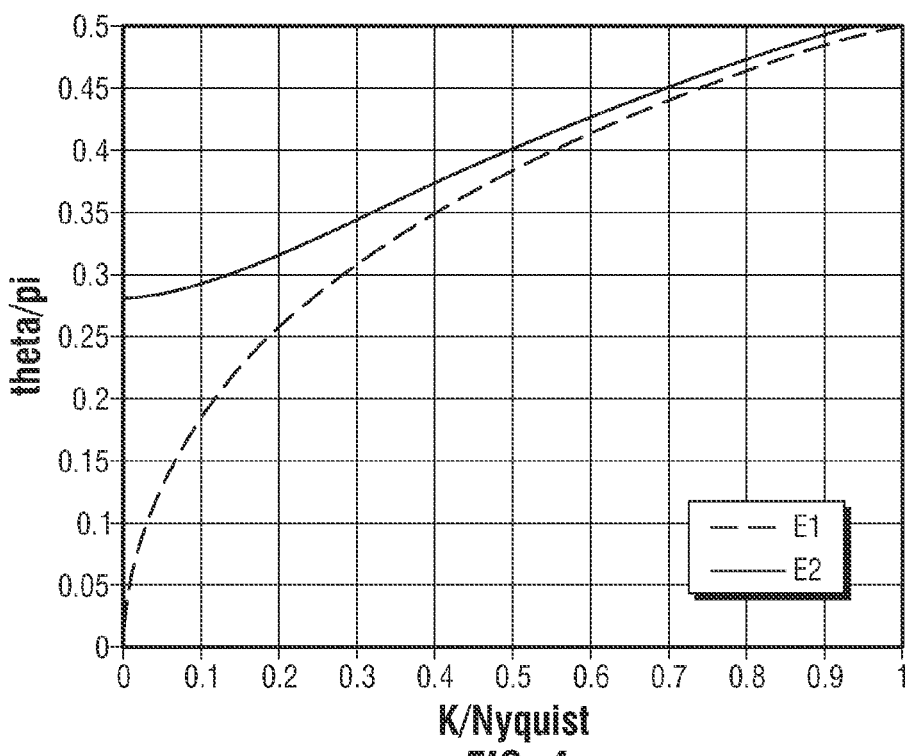
FIG. 4 includes optimal phase vs. cut-off frequency for objective functions.

For the case of two vibrators, considered above, FIG. 4 shows the optimal angle as a function of spatial frequency cut-off K, with objective function E1 and E2.

The same method can be applied to more vibrators and in different patterns. Again, although the formulae above are for spatial frequencies in one direction, similar objective functions may be derived where the one dimensional spatial frequency integral in the expressions for E1 and E2 is replaced by a two dimensional integral over a suitable domain in the spatial frequency plane In another example there are three vibrators, each shooting three times, positioned in a line with equal separation between vibrators. There is a 3×3 source matrix S, which has three angle parameters to be chosen, labeled as α, β, and γ.

$$ang(S) = \begin{pmatrix} 0 & \alpha & \beta \\ \beta & \alpha & 0 \\ 0 & \gamma & 0 \end{pmatrix}$$

Figure 5:
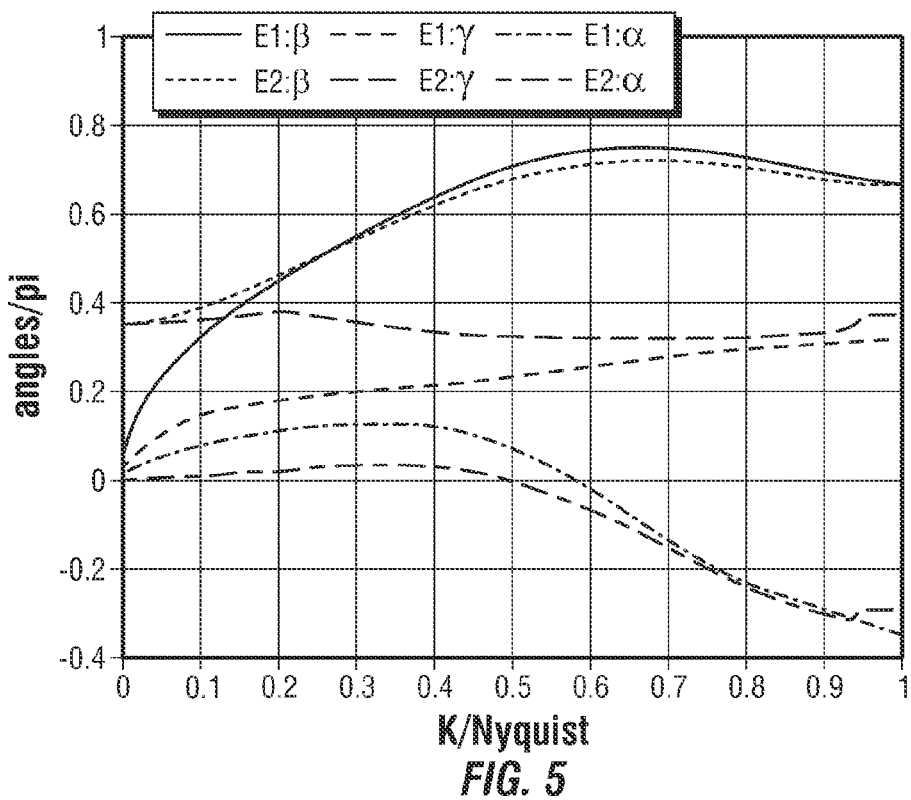
FIG. 5 includes matrix phases vs. cut-off frequency for objective functions.
Figure 6:
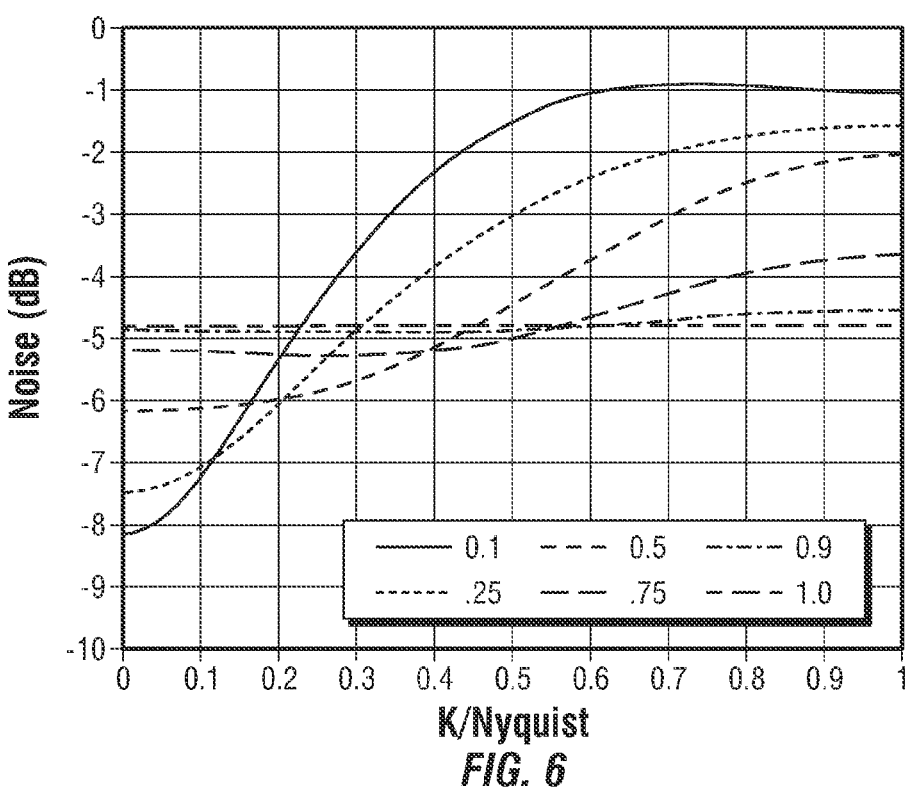
FIG. 6 includes spatial spectrum of noise for different sets of optimal angles (3×3 matrix), with objective function E2.
Figure 7:
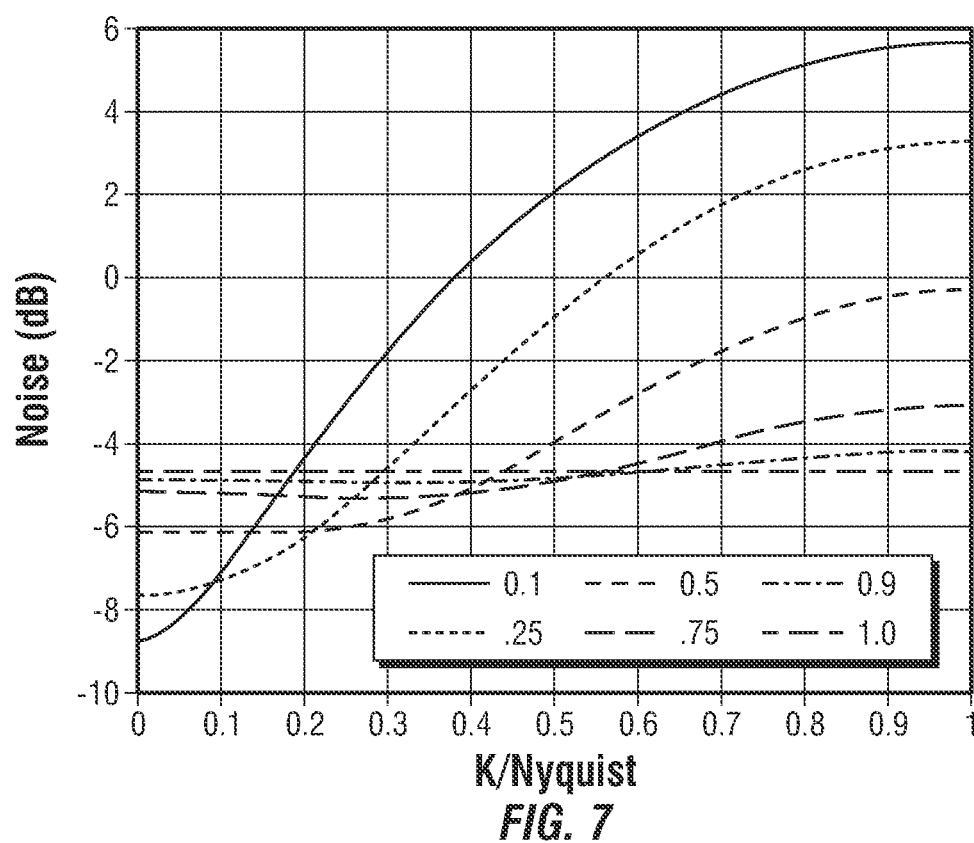
FIG. 7 includes spatial spectrum of noise for different sets of optimal angles (3×3 matrix), with objective function E1.

FIG. 5 shows the result of the same optimization for the 3×3 matrix with lines for angles α, β, and γ for objective functions E1 and E2. FIG. 6 shows the spatial wave number variation of the noise for the optimal angles according to function E2, for 6 values of K, normalized by the Nyquist spatial frequency, namely 0.1, 0.25, 0.5, 0.75, 0.9 and 1. The curve with lowest noise at K=0 is for K=0.1 times the Nyquist, the curve with the next lowest value at K=0 is for K=0.25 times the Nyquist, etc. FIG. 7 shows the same curves for objective function E1 (the curves are in the same order). Thus, introducing the maximum term in the objective function only reduces (slightly) the performance at the lowest wave numbers but greatly increases the performance for high wave numbers.

There may be situations where the signal has an asymmetric spatial spectral distribution. For instance, if the shooting line extends to one side of the geophone spread, the signal may be entirely contained in one side of the spatial spectrum. In this case the spatial frequency range over which optimization would be done would not be symmetric about the origin, or equivalently for areal patterns of vibrators, the two-dimensional spatial frequency domain may not be centered on the origin. As the position of the vibrators with respect to the receivers varies, the spatial frequency range for which the relative angles should be varied may change, and hence, as the vibrators move along the line, the relative phases may change also.

In order to translate the angles derived by optimization into sweep variations consider, for example, a situation where the slowest wavenumber of the compressional energy contributing to the reflection image is 1/2000 s/m. If the vibrator spacing in the group is 25 m, then the spatial sampling is not aliased for frequencies below 40 Hz. With sweep parameters of 8-80 Hz, at the bottom end of the sweep range the highest spatial wavenumber containing data is 1/5 Nyquist. In this case one can envision using matrix phases that start with minimizing the spatial noise energy with amplitude less than 1/5 of Nyquist, and changing these smoothly so the spatial noise energy in the signal band is minimized as the frequency increases, until by 40 Hz, the noise is flat across the spatial frequency spectrum. Thus, for instance, for three vibrators the initial angles α, β and γ would be chosen from FIG. 5 and would then follow trajectories close to, for example, the E2: α, E2: β, and E2: γ lines as the frequency increased. While changing the phase very slowly (as done in some embodiments) may have little effect on the frequency spectrum of the sweep, fast changes and fast rates of change of phase (as done in some embodiments) may add amplitude changes to the frequency spectrum of the sweep.

While the optimization in this section has used particular Fourier domain methods, other objective functions may be used, both Fourier and non-Fourier domain.

One issue with applying simultaneous methods to allow single vibrator acquisition is the extra time needed. The extra time comes from two directions. First, the extra sweep time needed to compensate for the lower suppression of environmental noise when applying simultaneous techniques. Second, the multiple listening times necessary between the multiple sweeps.

By following the sweeps without waiting for the listening time between shots, the whole sweep series can be substantially shortened. However, this may be at the expense of harmonic energy from one sweep appearing as noise on the preceding sweep. There are sweep phasing schemes that can eliminate/reduce both the harmonic noise appearing on the preceding sweep (slip-noise), and on the same sweep (harmonic ghosting) by phase summation, while also providing a matrix with equal singular values. However, this is at some expense in terms of environmental noise suppression since it involves correlating a synthetic sequence of (N+1) sweeps with the N sweeps actually performed, thereby increasing environmental noise by approximately a factor of 1+1/N (if most of the environmental noise is incoherent source-generated noise (e.g., from the vibrator engine) then the increase will not be so large but such receivers are unlikely to have signal to noise problems from environmental noise).

Within the same spirit as the preceding calculations, one can look for source phase matrices which do not have equal singular values, but which have good summed noise suppression, adequate individual source point separation (total noise), and also suppress harmonics. Rather than use a sequence of (N+1) sweeps, if one can live with normal harmonic ghosting then one can look for the reduction in slip noise.

The dimensionality of the problem dictates that if one is going to achieve a substantial reduction in harmonic noise for M vibrators and H harmonics, then one may sweep at least (M+H) times.

Choosing the right cost function, and then finding the minimum (with the typical size of matrix involved) may be difficult. More sophisticated methods of non-linear constrained optimization would simplify specifying the problem (e.g., putting a bound of the total noise while minimizing the summed and harmonic noise). For instance, for two vibrators with the following phase matrix (7 sweeps):

Vibrator one: −8.5, −153.3, 161.3, −157.2, −41.3, 73.8, −173.5

Vibrator two: −44.3, −141.8, 117.8, −145.0, −35.5, 95.7, −18.3 achieves suppression of the $2^{nd}$, $3^{rd}$, $4^{th}$ and $5^{th}$ harmonics by 13.6, 20.0, 4.2 and 26 dB respectively, with a summed noise 0.75 dB worse than sweeping in-phase and a total noise 2.3 dB worse than a matrix with equal singular values. Rather than use the suppression of the total harmonic noise, one could put more weight on reducing the harmonic noise on the summed records, which allows suppression to be achieved with a reduced number of sweeps. These are fixed angles, not varying with frequency, similar methods to those described above may be used to seek a frequency dependent set of angles which, at low frequencies, suppress both the environmental noise and harmonic noise at low wave numbers and, at high frequencies, give good total noise performance and suppress the total harmonic noise. Since the harmonic noise occurs at different frequencies, obtaining good frequency dependent angles is a complicated problem. For instance the angles used at 72 Hz would suppress the $2^{nd}$ harmonic noise generated by the 36 Hz angles, the $3^{rd}$ harmonic noise from the 24 Hz angles, the $4^{th}$ harmonic noise from 12 Hz, etc. Still, in one embodiment one may achieve excellent performance in total harmonic suppression when the number of sweeps is M+H+1 or greater. However, for concatenated sweeps there are other factors which will also affect what is the preferred number of sweeps and phasing For a fixed total sweep time at full amplitude, increasing the number of sweeps will increase the total time for the sweeps to take place, as each sweep will require a ramp-up and ramp-down time. In an embodiment, the maximum number of sweeps may be less than the ratio of the total sweep time to the listening time; otherwise more time may be needed. As far as slip noise is concerned, the fraction of the seismic record (viewed as a time frequency plane) over which slip noise will be present is inversely proportional to the sweep length and hence for a fixed total sweep time. It will be proportional to the number of sweeps. Thus any increase in performance in harmonic attenuation should, in an embodiment, more than balance the extra harmonic noise that will be present. As well as harmonic noise, in the other direction, if the sweeps start on too quickly from one another it will increase noise due to reverberant ground roll persisting from the preceding shot. Additionally, short sweeps tend to have worse phase lock, and so the extra slip noise caused by deviation from the theoretical sweep pattern will increase. As the deviation increases linearly with harmonic number, this noise will increase fastest for the high order harmonics. However, for splitting the total sweep time into more sweeps, non-linear noise suppression techniques (such as diversity inversion) reduce susceptibility to impulsive noise.

Some of the discussion above relates to suppressing harmonic noise from the following sweep. In some circumstances harmonic noise from the same sweep (harmonic ghost noise) may be problematic (e.g., for concatenated sweeps, during normal acquisition with a listening time gap between sweeps, etc.). A similar optimization scheme may be used in these circumstances, either including just the ghost suppression, or both the ghost and slip-noise suppression in the optimization.

Thus, by choosing (or sweeping through) appropriate phase angles one can acquire simultaneous data, and apply corrections for statics and source signature differences before recombining the grouped data, with a manageable effect on the suppression of environmental noise compared to conventional group data for a similar time spent shooting. Using frequency-varying phase angles and simultaneous shooting, one can provide environmental noise suppression at low spatial frequencies as good as (or at least an improvement towards) that obtained for grouped data (while also enabling ground roll suppression through improved spatial sampling). Finally, including harmonic slip-noise into the optimization opens the prospect of reducing the acquisition time to almost that of conventional shooting (but with advantages of point source acquisition and manageable slip-noise in the raw data).

As indicated herein, an embodiment includes a method comprising simultaneously conducting first and second seismic sweeps at a relative phase offset (e.g., $\Theta(t)$) from one another. The phase offset varies during the simultaneous sweeping. The phase offset may smoothly increase or decrease over all or a portion of the sweeps. However, the phase offset may have varying rates of increase or decrease. Some changes may be immediate (i.e., hopping from rate immediately to a markedly different rate). The phase change may occur in any number of techniques that include two sweeps that overlap one another (for a short time or a long time) with or without simultaneous start and/or finish times. The phase offset may be selected from a listing or matrix based on geophysical, timing, or other variables. A user may not have foreknowledge of the ideal phase offset before sweeping commences. However, the user may (after sweeping is complete and processing has begun) analyze the data at varying phase offsets (which occur because of the varying phase offsets built in to the sweeping) to, after the fact, determine the best phase offset data. The phase offset may vary based on frequency. For example, phase offset may vary slowly for low frequency portions (or high frequency portions) of the sweep. Amplitudes for the sweeps may both be constant or one or both may change during the sweeps. The method is not limited to two sweeps but may include, for example, three or more sweeps. The third or additional sweep may be in phase with the first sweep or the second sweep or neither of the first and second sweeps for all or a portion of the overlapping segments of the sweeps.

Embodiments described herein implement varying relative phase with frequency to achieve enhanced noise rejection at low spatial frequencies after the data has been separated. Also, embodiments described herein implement varying relative phase with frequency to achieve enhanced noise rejection at low spatial frequencies and attenuation of harmonic noise.

Figure 8:
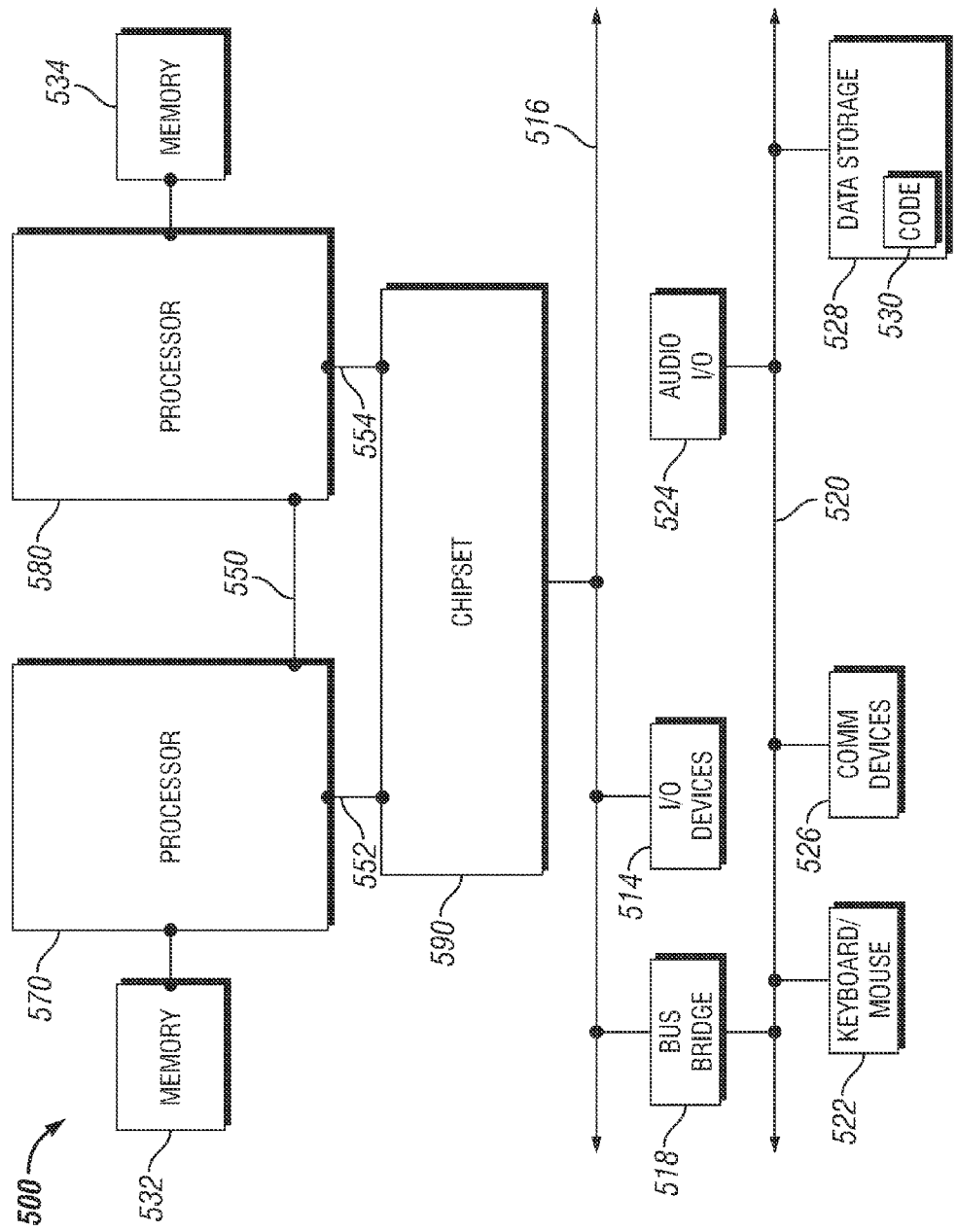
FIG. 8 includes a system for operation with various embodiments of the invention.

Embodiments may be implemented in many different system types. Referring now to FIG. 8, shown is a block diagram of a system in accordance with an embodiment of the present invention. Multiprocessor system 500 is a point-to-point interconnect system, and includes a first processor 570 and a second processor 580 coupled via a point-to-point interconnect 550. Each of processors 570 and 580 may be multicore processors. The term "processor" may refer to any device or portion of a device that processes electronic data from registers and/or memory to transform that electronic data into other electronic data that may be stored in registers and/or memory. First processor 570 may include a memory controller hub (MCH) and point-to-point (P-P) interfaces. Similarly, second processor 580 may include a MCH and P-P interfaces. The MCHs may couple the processors to respective memories, namely memory 532 and memory 534, which may be portions of main memory (e.g., a dynamic random access memory (DRAM)) locally attached to the respective processors. First processor 570 and second processor 580 may be coupled to a chipset 590 via P-P interconnects, respectively. Chipset 590 may include P-P interfaces. Furthermore, chipset 590 may be coupled to a first bus 516 via an interface. Various input/output (I/O) devices 514 may be coupled to first bus 516, along with a bus bridge 518, which couples first bus 516 to a second bus 520. Various devices may be coupled to second bus 520 including, for example, a keyboard/mouse 522, communication devices 526, and data storage unit 528 such as a disk drive or other mass storage device, which may include code 530, in one embodiment. Further, an audio I/O 524 may be coupled to second bus 520.

Embodiments may be implemented in code and may be stored on a non-transitory storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions. Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered. Components or modules may be combined or separated as desired, and may be positioned in one or more portions of a device.

In one embodiment, the apparatus used to conduct the sweeps consists of more than one vibratory device, usually referred to as a seismic vibrator, each of which is located at a different spatial position, which can controllably transmit a desired swept frequency signal into the subsurface. The normal form of the vibratory device is a hydraulically moved mass which sits on the earth surface, but other forms are also known and to which the invention may be applied, such as an electrically driven mass on the earth's surface, a varying volume (which may be driven hydraulically or electrically) which is submersed below a water surface (known as a marine vibrator), or a vibratory apparatus which sits on the sea or lake bed (sub-sea vibrator). In addition to the vibratory sources employed, a multiplicity of sensors is deployed on the earth's surface, below the earth's surface, in or on the water surface or on or below the sea bed to record the earth response to the vibratory sources. The data from the sensors is recorded using recording systems such as magnetic tape, disks or other means and is then manipulated using computers or other calculation devices.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   simultaneously conducting a first seismic sweep with a first seismic source and a second seismic sweep with a second seismic source, different from the first seismic source, at a relative phase offset from the first seismic sweep;
   wherein the phase offset varies during the simultaneous sweeping,
   determining a first phase for the first sweep and second and third phases for the second sweep; and
   conducting the first sweep at the first phase while simultaneously conducting the second sweep at the second phase and then, while the first sweep is still being conducted, simultaneously conducting the second sweep at the third phase.

2. The method of claim 1 including selecting the second and third phases from a preexisting matrix.

3. The method of claim 1, wherein the phase offset varies during the simultaneous sweeping based on the frequency for one of the first and second sweeps.

4. The method of claim 3, wherein respective amplitudes for the first and second sweeps are held relatively constant while conducting the first and second sweeps.

5. The method of claim 1, wherein the phase offset varies with a constant rate of change for at least a portion of the simultaneous sweeping.

6. The method of claim 1 including simultaneously conducting the first sweep and a third seismic sweep at an additional relative phase offset from one another, wherein the additional phase offset varies during the simultaneous sweeping of the first and third sweeps.

7. The method of claim 1 including simultaneously conducting the first sweep and a third seismic sweep in phase with one another.

8. The method of claim 1 wherein the first sweep includes one of an upsweep and a downsweep and the second sweep includes one of an upsweep and a downsweep.

9. The method of claim 1 including, after conducting the first and second sweeps to generate seismic data, analyzing the seismic data corresponding to multiple phase offset values.

10. The method of claim 1, including:
    determining first and second seismic source drive signals respectively for the first and second sweeps:
    wherein (a) the first drive signal includes a component according to the equation $FA=W(t)\cos(2\pi|f0t+\frac{1}{2}\phi t2|)$, (b) the second drive signal includes a component according to the equation $FB=W(t)\cos(2\pi|f0t+\frac{1}{2}\phi t2|+\Theta[t])$, (c) $\Theta(t)$ is a phase angle that varies while the first and second sweeps are simultaneously conducted, (d) $\phi$ is the respective rate of change of frequency each sweep, $f0$ is the respective start frequency for each sweep, and W is a smoothing function.

11. The method of claim 1 including:
    determining a first phase for the first sweep and second and third phases for the second sweep;
    conducting the first sweep at the first phase while simultaneously conducting the second sweep at the second phase and then, while the first sweep is still being conducted, simultaneously conducting the second sweep at the third phase; and
    after conducting the first and second sweeps conducting third and fourth sweeps at substantially the same locations as the first and second sweeps, wherein phase variation between the third and fourth sweeps differs from the phase variation between the first and second sweeps.

12. The method of claim 1 comprising:
    recording a response to the first and second sweeps; and
    separating the response into a first approximation of a first response to the first sweep and a second approximation of a second response to the second sweep.

13. The method of claim 1, wherein respective ranges of the first and second seismic sweeps include at least one common frequency.

14. An article comprising a non-transitory medium storing instructions that enable a processor-based system to:
 determine first and second drive signals configured to simultaneously drive a first seismic sweep of a first seismic source and a second seismic sweep of a second seismic source, different from the first seismic source, at a relative phase offset from the first seismic sweep;
 wherein the phase offset varies during the simultaneous sweeping,
 determine a first phase for the first sweep and second and third phases for the second sweep; and
 wherein the drive signals are to drive the first sweep at the first phase while simultaneously driving the second sweep at the second phase and then, while the first sweep is still being conducted, simultaneously drive the second sweep at the third phase.

15. The article of claim 14, wherein the phase offset varies during the simultaneous sweeping based on the frequency for one of the first and second sweeps.

16. The article of claim 14, wherein the phase offset varies with a constant rate of change for at least a portion of the simultaneous sweeping.

17. The article of claim 14, wherein the drive signals are to simultaneously drive the first sweep and a third seismic sweep in phase with one another.

18. A system comprising:
 a memory; and
 a processor, coupled to the memory, to determine first and second drive signals configured to simultaneously drive a first seismic sweep of a first seismic source and a second seismic sweep of a second seismic source, different from the first seismic source, at a relative phase offset from the first seismic sweep;
 wherein the phase offset varies during the simultaneous sweeping, and
 determine a first phase for the first sweep and second and third phases for the second sweep; and
 wherein the drive signals are to drive the first sweep at the first phase while simultaneously driving the second sweep at the second phase and then, while the first sweep is still being conducted, simultaneously drive the second sweep at the third phase.

19. The system of claim 18, wherein the phase offset varies during the simultaneous sweeping based on the frequency for one of the first and second sweeps.

20. The system of claim 18, wherein the phase offset varies with a constant rate of change for at least a portion of the simultaneous sweeping.

* * * * *